(12) United States Patent
Ambrose et al.

(10) Patent No.: US 9,221,977 B2
(45) Date of Patent: Dec. 29, 2015

(54) COMPOSITIONS AND METHODS FOR COATING FOOD CANS

(71) Applicant: PPG Industries Ohio, Inc., Cleveland, OH (US)

(72) Inventors: Ronald R. Ambrose, Loganville, GA (US); Michael J. Ziegler, Cranberry Township, PA (US); John M. Dudik, Apollo, PA (US)

(73) Assignee: PPG industries Ohio, Inc., Cleveland, OH (US)

( * ) Notice: Subject to any disclaimer, the term of this patent is extended or adjusted under 35 U.S.C. 154(b) by 272 days.

(21) Appl. No.: 13/832,034

(22) Filed: Mar. 15, 2013

(65) Prior Publication Data
US 2013/0202825 A1   Aug. 8, 2013

Related U.S. Application Data

(60) Division of application No. 10/737,085, filed on Dec. 16, 2003, now abandoned, and a continuation-in-part of application No. 10/231,652, filed on Aug. 30, 2002, now Pat. No. 7,745,508.

(51) Int. Cl.

| | | |
|---|---|---|
| *C09D 5/08* | (2006.01) | |
| *C09D 151/08* | (2006.01) | |
| *C09D 167/00* | (2006.01) | |
| *C08F 283/02* | (2006.01) | |
| *C08L 51/08* | (2006.01) | |
| *C08L 67/02* | (2006.01) | |
| *C08L 67/06* | (2006.01) | |
| *C09D 167/02* | (2006.01) | |
| *C09D 167/04* | (2006.01) | |
| *C09D 167/06* | (2006.01) | |
| *C08K 5/00* | (2006.01) | |
| *C08K 5/3492* | (2006.01) | |
| *C08L 33/00* | (2006.01) | |
| *C08L 61/00* | (2006.01) | |
| *C08L 61/12* | (2006.01) | |
| *C08L 87/00* | (2006.01) | |

(52) U.S. Cl.
CPC ............... *C09D 5/08* (2013.01); *C08F 283/02* (2013.01); *C08L 51/08* (2013.01); *C08L 67/02* (2013.01); *C08L 67/06* (2013.01); *C09D 151/08* (2013.01); *C09D 167/00* (2013.01); *C09D 167/02* (2013.01); *C09D 167/04* (2013.01); *C09D 167/06* (2013.01); *C08K 5/0025* (2013.01); *C08K 5/34922* (2013.01); *C08L 33/00* (2013.01); *C08L 61/00* (2013.01); *C08L 61/12* (2013.01); *C08L 87/005* (2013.01); *Y10T 428/1352* (2015.01)

(58) Field of Classification Search
CPC ....... C09D 5/08; C09D 151/08; C09D 167/00; Y10T 428/1352
USPC ............ 426/106; 523/100; 525/1, 7.1, 11, 32, 525/35, 36, 38, 39, 40, 41, 43, 132, 165
See application file for complete search history.

(56) References Cited

U.S. PATENT DOCUMENTS 5,290,828 A * 3/1994 Craun et al. .................. 523/423

FOREIGN PATENT DOCUMENTS

WO   WO 9951696 A1 * 10/1999

* cited by examiner

*Primary Examiner* — Kelechi Egwim
(74) *Attorney, Agent, or Firm* — Diane E. Meyers

(57) ABSTRACT

A composition for coating food cans is disclosed. The composition comprises a polyester/acrylic graft copolymer, a polyester resin, and a crosslinker. Methods for coating cans using the compositions of the invention are also disclosed.

24 Claims, No Drawings

COMPOSITIONS AND METHODS FOR COATING FOOD CANS

CROSS-REFERENCE TO RELATED APPLICATION

This application is a divisional of U.S. patent application Ser. No. 10/737,085, filed Dec. 16, 2003, which is a continuation-in-part of U.S. patent application Ser. No. 10/231,652, filed Aug. 30, 2002.

FIELD OF THE INVENTION

The present invention relates to compositions and methods for coating metal. More specifically, the present invention relates to compositions and methods for coating food cans, wherein the coating compositions comprise polyester and acrylic polymers.

BACKGROUND OF THE INVENTION

The application of various treatment and pretreatment solutions to metals to retard or inhibit corrosion is well established. This is particularly true in the area of metal food and beverage cans. Coatings are applied to the interior of such containers to prevent the contents from contacting the metal of the container. Contact between the metal and the food or beverage can lead to corrosion of the metal container, which can then contaminate the food or beverage. This is particularly true when the contents of the can are acidic in nature, such as tomato-based products and soft drinks. The coatings applied to the interior of food and beverage cans also helps prevent corrosion in the head space of the cans, which is the area between the fill line of the food product and the can lid; corrosion in the head space is particularly problematic with food products having a high salt content.

Various epoxy-based coatings and polyvinyl chloride-based coatings have been used in the past to coat the interior of metal cans to prevent corrosion. The recycling of materials containing polyvinyl chloride or related halide-containing vinyl polymers can generate toxic by-products, however; moreover, these polymers are typically formulated with epoxy-functional plasticizers. In addition, epoxy-based coatings are prepared from monomers such as bisphenol A and bisphenol A diglycidylether ("BADGE"), which is being reported as having negative health effects. While attempts have been made to scavenge the residual unreacted epoxy with, for example, acid functional polymers, this does not adequately address the problem; some free BADGE or its by-products will still remain. Government authorities, particularly in Europe, are becoming even more restrictive on the amount of free BADGE or its by-products that are acceptable. Thus, there is a need for food and beverage can liners that are virtually free from BADGE, epoxy and vinyl products.

SUMMARY OF THE INVENTION

The present invention is directed to compositions and methods for coating the inside of food cans. The term "food cans" is used herein to refer to cans, containers or any type of metal receptacle used to hold any type of food or beverage. The methods generally involve coating the cans with a composition comprising a polyester and an acrylic polyol. In one embodiment, a graft copolymer is formed from the polyester and the acrylic, and the composition further comprises a polyester resin.

As will be appreciated in the art, polyester coatings are good for flexibility, but are subject to hydrolysis in acid environments. In contrast, acrylics are good for providing resistance, but are inflexible. The use of either polyester or acrylic copolymers alone, therefore, has drawbacks. Their use together, however, is sometimes problematic because polyester and acrylic are often incompatible. Their use together in the present invention therefore requires that they be made compatible in some way; methods for doing so are described herein and are the further subject of the invention.

DETAILED DESCRIPTION OF THE INVENTION

The present invention is directed to compositions for coating food cans comprising an acrylic copolymer, a polyester, and a crosslinker. The polyester and acrylic copolymer should be made compatible to form the present compositions. This can be accomplished by any of various methods known in the art or described herein, including but not limited to employing blending techniques known in the art, preparing interpenetrating networks, or forming a graft copolymer.

The present invention is further directed to compositions for coating food cans comprising a polyester/acrylic graft copolymer, a polyester resin, and a crosslinker. It will be appreciated that the graft copolymer and/or polyester resin may contain solvent, and that additional solvents may also be used.

In certain embodiments, any of the compositions of the present invention can be "epoxy-free". "Epoxy-free" means that the polyester, acrylic, and every other portion of the composition are free from oxirane rings or residues of oxirane rings; bisphenol A; BADGE or adducts of BADGE; and/or polyvinylchloride or related halide-containing vinyl polymers.

The polyester component(s) used in the present methods can be prepared by conventional means such as polyesterification of a polycarboxylic acid or anhydride with a polyol using techniques known to those skilled in the art. Usually, the polycarboxylic acids and polyols are aliphatic or aromatic dibasic acids and diols, although the invention is not so limited. Transesterification of polycarboxylic acid esters using conventional techniques is also possible.

Typically, the weight average molecular weight ("Mw") of the polyester used in the polyester/acrylic blends, networks or copolymers will range from 4,000 to 20,000, such as 5,000 to 13,000, or 7,000 to 11,000; the Mw of the polyester resin used in some embodiments of the present invention will range from 4,000 to 25,000, such as 6,000 to 22,000, or 8,000 to 22,000. The polyester used in the polyester/acrylic blends, networks, or copolymers will typically have a hydroxy value of from 0 to 200 mg KOH/g resin, such as from 30 to 70, or about 40, and an acid value of less than about 10, such as less than 5. The polyester resin used in some embodiments of the present invention will typically have a hydroxy value of from 10 to 50 mg KOH/g resin, such as about 25, +/−5, and an acid value of less than about 10, such as less than 5.

Any polyols known to be suitable for making the polyesters can be used to form the polyester component(s) of the present compositions. Examples include but are not limited to alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated Bisphenol A; cyclohexanediol; 1,3-propane diol; glycol; 1,4-butane diol; 1,3-butane diol; butyl ethyl propane diol; trimethyl pentane diol; cyclohexanedimethanol; caprolactonediol, for example, the reaction product of epsiloncaprolactone and ethylene glycol; hydroxy-alkylated bisphenols; polyether glycols, for example, poly(oxytetramethylene) glycol and the like. Polyols of higher functionality may also be used in limited quantity, provided they have no adverse effects on flexibility. Examples include trimethylolpropane, trimethylolethane, pentaerythritol, tris-hydroxyethylisocyanu rate and the like.

Similarly, any acid known for use in the preparation of polyesters can be used to prepare the polyester polymer component(s) of the present invention, such as carboxylic acids or anhydrides having 2 to 18 carbon atoms per molecule. Examples include phthalic acid, isophthalic acid, 5-tert-butyl isophthalic acid, endomethylene tetrahydrophthalic acid, tetrachlorophthalic anhydride, chlorendic acid, naphthalene dicarboxylic acid, terephthalic acid, tetrahydrophthalic acid, hexahydrophthalic acid, methylhexahydrophthalic acid, 1,3-cyclohexane dicarboxylic acid, 1,4-cyclohexane dicarboxylic acid, adipic acid, azelaic acid, sebacic acid, maleic acid, fumaric acid, itaconic acid, succinic acid, glutaric acid, decanoic diacid, dodecanoic diacid and other dicarboxylic acids of various types. The polyester component(s) may include minor amounts of monobasic acids such as benzoic acid, stearic acid, acetic acid and oleic acid. Also, there may be employed higher carboxylic acids, such as trimellitic acid and tricarballylic acid. Where acids are referred to above, it is understood that anhydrides thereof that exist may be used in place of the acid. Also, lower alkyl esters of diacids such as dimethyl glutarate and dimethyl terephthalate can be used.

In one embodiment, one or both of the polyester components are unsaturated. While any unsaturated polyester can be used according to the present invention, a particularly suitable polyester is formed from butanediol, ethylene glycol, cyclohexane dicarboxylic acid, isophthalic acid and maleic anhydride. This embodiment is particularly suitable when a graft copolymer is made between the polyester and acrylic copolymer; maleic anhydride promotes grafting with the acrylic copolymer. Maleic acid, fumaric acid and/or itaconic acid and/or the anhydrides of these acids can also be used instead of or in addition to maleic anhydride to produce polyesters that also have components particularly suitable for graft promotion. In certain instances, the polyester of this embodiment is also particularly desirable, as all of the components of the polyester are approved by the United States Food and Drug Administration ("FDA") for direct food contact; these components are also listed on the European Inventory of Existing Commercial Substances ("EINECS").

In one embodiment, one or both of the polyester components is made with excess polyol as compared with acid so as to produce a polyester that has hydroxy functionality. One or both of the polyester components can also be prepared so as to either lack or have acid functionality.

As noted above, in certain embodiments of the present invention there are two polyester components, one polyester component in the polyester/acrylic graft copolymer and one polyester component that is sometimes referred to herein as the polyester resin. The term "polyester component(s)" is used herein to refer to one or both of these components as would be understood from the context. The two polyester components can have the same composition, that is they can be formed from the same starting materials; alternatively, they can be formed from different starting materials. Similarly, each of the polyester components can have the same Mw or one can have a higher Mw than the other. For example, the polyester resin can have an Mw that is higher than that of the polyester used in the graft copolymer, such as 3,000 to 15,000 daltons higher or 4,000 to 8,000 daltons higher.

Various acrylic monomers can be combined to prepare the acrylic copolymer used in the present invention. Examples include methyl(meth)acrylate, ethyl(meth)acrylate, butyl (meth)acrylate, 2-ethylhexyl(meth)acrylate, (meth)acrylic acid, vinyl aromatic compounds such as styrene and vinyl toluene, nitriles such as (meth)acrylonitrile, and vinyl esters such as vinyl acetate. Any other acrylic monomers known to those skilled in the art could also be used. The term "(meth) acrylate" and like terms are used conventionally and herein to refer to both methacrylate and acrylate. A particularly suitable acrylic copolymer is formed with styrene, butyl acrylate, ethylhexyl acrylate and methacrylic acid, either alone or in further combination with hydroxyethyl methacrylate and methylmethacrylate. Again, in certain instances this acrylic copolymer comprises components approved by the FDA for use with food cans, and listed on EINECS. Typically, the Mw of the acrylic copolymer will range from about 10,000 to 250,000, such as 20,000 to 150,000, or 25,000 to 100,000.

As discussed above, the acrylic copolymer and polyester used in the present composition can be treated in any manner so as to render the two compatible. By "compatible" is meant that the polyester and the acrylic copolymer may be combined together in a coating without phase separation, thus forming a homogeneous product. Compatibilized copolymers can simply be blended together. In this blended embodiment, the acrylate copolymer used according to the present invention does not have pendant glycidyl groups when the polyester is acid terminated, and the acrylate copolymer does not have pendant hydroxy groups when the polyester is hydroxy terminated. Compatibilization can be achieved, for example, by using an acrylic copolymer having an Mw similar to the Mw of the polyester (i.e. within about 1,000). Various functional groups can also be added to the acrylic and/or polyester to compatibilize the two. For example, the acrylic copolymer can have N—(N-butoxymethyl)acrylamide ("NBMA") functionality. When the acrylic has been functionalized with NBMA, it typically will have an Mw of about 20,000 or less. Other compatibilizing functional groups include acid functional groups, hydroxy groups, amide groups and the like. Appropriate solvents referred to in the art as "coupling solvents" can also aid in compatibilization. An example is ethylene glycol monobutyl ether, commercially available as Butyl Cellosolve from Dow Chemical.

The acrylate copolymer and polyester can also be compatibilized, for example, by forming interpenetrating polymer networks. The preparation of such networks is described, for example, in U.S. Pat. No. 6,228,919, incorporated by reference herein.

Another method by which the polyester and acrylate copolymer can be compatibilized is through the formation of a graft copolymer. A graft copolymer can be formed using techniques standard in the art. The terms "polyester/acrylic graft copolymer" or simply "graft copolymer" are used herein to refer both to graft copolymers wherein polyester is grafted to acrylic and wherein acrylic is grafted to polyester. For example, in one method, a polyester is prepared according to conventional methods using the materials described above. The acrylic monomers are then added to the polyester. The acrylic can then be polymerized using a standard free radical initiator. In this manner, the acrylate copolymer is grafted to the already-made polyester.

Alternatively, the polyester can be grafted to an already-made acrylic copolymer. In this embodiment, a maleic anhydride group can be polymerized in the acrylic copolymer and, subsequently, hydroxyl groups from the polyester can be allowed to react with the acrylic to create a graft copolymer; the result will be an acrylic copolymer having polyester moieties grafted thereto.

In the methods for grafting according to the present invention, one selects a moiety to be incorporated into the polyester and a monomer to be included with the acrylate monomers that will react with each other. A particularly suitable example uses maleic anhydride in the formation of a polyester and styrene as one of the acrylic monomers. In this embodiment, the styrene will react with the maleic anhydride; the acrylic copolymer will grow off of the styrene through the formation of free radicals. The result will be a polyester having acrylic copolymers grafted thereto. It will be appreciated that not all of the acrylic and polyester will graft; thus, there will be some "neat" polyester and some "neat" acrylate copolymer in the solution. Enough of the acrylate copolymer and polyester will graft, however, to compatibilize the two normally incompatible polymers.

It will be appreciated that maleic anhydride and styrene are offered as examples of two components that will promote grafting between the normally incompatible polymers, but that the invention is not so limited. Other compounds such as fumaric acid/anhydride or itaconic acid/anhydride may be incorporated into a polyester for grafting with a styrene containing acrylic. Other moieties that will promote grafting between the polyester and acrylic can also be used. Any group of compounds can be used for this purpose. All of these compounds are referred to herein as "graft promoting components". The amount of graft promoting component used in each of the polyester and/or acrylate portions can affect the final product. If too much of these components are used, the product can gel or be otherwise unusable. The graft-promoting components should therefore be used in an amount effective to promote grafting but not to cause gelling. Enough grafting should be effected to allow the polyester and acrylate polymers to be compatible. In the maleic anhydride/styrene example, usually 2 to 6 weight percent maleic with 8 to 30 weight percent styrene can be used, with weight percent being based on the weight of the polyester and the weight of the acrylic, respectively.

The Mw of the graft copolymer will typically be from about 3,000 to 250,000, such as from about 5,000 to 125,000, or from about 60,000 to 120,000.

The weight ratio of polyester to acrylic in the graft copolymer, blend or network, can vary widely. For example, the polyester to acrylic ratio in the graft copolymer, blend or network, can range from 95:5 to 20:80. It has been determined that varying the amount of polyester in the composition will affect the amount of flexibility. A particularly suitable ratio of polyester to acrylic in the graft copolymer, blend or network, for embodiments used in coating food cans is 70:30, which gives a relatively flexible product that still has suitable acid resistance. When a polyester resin is used in conjunction with a graft copolymer, the weight ratio of polyester in the graft copolymer will be as described above. The weight of polyester resin to graft copolymer will typically be 5:35 to 95:65, such as 25 to 75.

The present compositions further comprise a suitable crosslinker. A suitable crosslinker can be determined based upon the needs and desires of the user, and can include, for example, melamine crosslinkers, and phenolic crosslinkers. Melamine crosslinkers are widely commercially available, such as from Cytec Industries, Inc. as CYMEL 303, 1130, 325, 327 and 370. Phenolic crosslinkers include, for example, novolacs, resoles, and bisphenol A. Phenolic resoles that are not derived from bisphenol A are particularly suitable for use on food cans. One embodiment of the present invention specifically excludes NCO group free crosslinkable urethane resins from the composition.

The compositions of the present invention may also comprise a solvent either introduced through the acrylic and/or polyester components. Suitable solvents include esters, glycol ethers, glycols, ketones, aromatic and aliphatic hydrocarbons, alcohols and the like. Particularly suitable are xylenes, propyleneglycol monomethyl acetates, and dibasic esters such as dimethyl esters of adipic, glutaric and succinic acids.

The compositions of the present invention can also contain any other conventional additives such as pigments, colorants, waxes, lubricants, defoamers, wetting agents, plasticizers, fortifiers and catalysts. Any mineral or sulfonic acid catalyst can be used. Particularly preferred for food can applications are phosphoric acid and dodecyl benzene sulfonic acid.

Typically, the compositions are prepared so as to be between about 30 and 50 weight percent solids. "Solids" will be understood by those skilled in the art as including such things as the polyester resin, the graft copolymer, crosslinkers, catalysts, other additives and the like. In the embodiments containing polyester resin in addition to the graft copolymer, higher amounts of crosslinker can be used as compared to embodiments lacking the polyester resin. This was found to result in films having higher solvent resistance and higher Tg without compromised flexibility.

The present invention is further directed to a method for coating food cans comprising applying any of the compositions described above to the food can. More specifically, these compositions comprise a polyester, an acrylic copolymer, optionally a polyester resin, a crosslinker, one or more solvents and optionally one or more conventional additives. The polyester and acrylic copolymer can be made compatible by any means described above such as using blending techniques known in the art, interpenetrating networks, or the novel graft copolymerizations described herein. The coating composition can be applied to the food can by any means known in the art such as roll coating, spraying, and electrocoating. It will be appreciated that for two-piece food cans, the coating will typically be sprayed after the can is made. For three-piece food cans, on the other hand, a coil or sheet will typically be roll coated with one or more of the present compositions first and then the can will be formed.

After application, the coating is then cured. Cure is effected by methods standard in the art. For coil coating, this is typically a short dwell time (i.e. 9 seconds to 2 minutes) at high heat (i.e. 485° F. peak metal temperature); for coated metal sheets cure is typically longer (i.e. 10 minutes) but at lower temperatures (i.e. 400° F. peak metal temperature).

Any material used for the formation of food cans can be treated according to the present methods. Particularly suitable substrates include tin-plated steel, tin-free steel, and black-plated steel.

The coatings of the present invention can be applied directly to the steel, without any pretreatment or adhesive aid being added to the metal first. In addition, no coatings need to be applied over top of the coatings used in the present methods.

The compositions of the present invention perform as desired both in the areas of flexibility and acid resistance. Significantly, these results can be achieved with an epoxy-free composition, that is, one that excludes epoxy, glycidal groups BADGE, oxirane rings, halide-containing vinyls or derivatives or residues of any of these compounds. Thus, the present invention provides particularly desirable compositions and methods for coating food cans, which avoid performance and health issues raised by other coatings and methods reported in the art.

In addition, the present invention provides methods for compatibilizing a polyester and an acrylic. These methods are discussed above and include, for example, the use of an acrylamide in the formation of the acrylic copolymer, and the graft copolymerization of an acrylic onto a polyester or a polyester onto an acrylic.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in any way.

Example 1

Polyester Polymer "A" was made as follows:

TABLE 1

| Ingredients | Parts by Weight |
|---|---|
| Charge #1 | |
| 2-Methyl-1,3-Propanediol | 2.4 |
| Ethylene Glycol | 1.0 |
| 1,6-Hexane Diol | 3.6 |
| Terephthalic Acid | 7.1 |
| Dibutyltin Oxide | 0.035 |
| Charge #2 | |
| Isophthalic Acid | 3.0 |
| Maleic Anhydride | 0.54 |
| Ionol | 0.018 |
| Charge #3 | |
| Xylene | 0.81 |
| Charge #4 | |
| Xylene | 5.8 |

Charge #1 was added to a 5-liter, 4 necked flask equipped with a motor driven stainless steel stir blade, a packed column connected to a water-cooled condenser and a heating mantle with a thermometer connected through a temperature feedback control device. The reaction mixture was heated to 195° C. for six hours during which time 1.3 parts water distilled off. The mixture was cooled briefly to 180° C., Charge #2 was added and the mixture again heated at 195° C. for four hours. After this hold, the reaction was cooled. Charge #3 was added, the packed column replaced with a Dean-Stark, and the mixture heated to reflux (190° C.). Heating continued for seven hours during which additional water azeotroped off. When the Acid Value of the solution was less than 1.5, the mixture was cooled to 150° C. and the resin thinned with Charge #4.

Example 2

Polyester Polymer "B" was made as follows:

TABLE 2

| Ingredients | Parts by Weight |
|---|---|
| Charge #1 | |
| 1,3-Butylene Glycol | 10.0 |
| Ethylene Glycol | 1.9 |
| Charge #2 | |
| 1,4-Cyclohexanedicarboxylic Acid | 14.5 |
| Isophthalic Acid | 6.0 |
| Maleic Anhydride | 1.0 |
| Dibutyltin Oxide | 0.067 |
| Methyl Hydroquinone | 0.0029 |
| Charge #3 | |
| Xylene | 1.5 |
| Charge #4 | |
| Xylene | 10.8 |

Charge #1 was added to a 5 liter, 4 necked flask equipped with a motor driven stainless steel stir blade, a packed column connected to a water-cooled condenser and a heating mantle with a thermometer connected through a temperature feedback control device. The reaction mixture was heated to 125° C. Charge #2 was added to the mixture and then heated to 155° C. Distillation of water began and continued for 3.5 hours. The temperature was increased to 175° C. for 90 minutes and then to 195° C. for four hours. The reaction temperature was increased to 200° C. for 3.5 hours where the distillation of water began to significantly slow. The reaction mixture was cooled to 180° C., the packed column replaced with a Dean-Stark and a nitrogen sparge was started. Charge #3 was added and the reaction was heated to 195° C. for seven hours at which time the acid value was less than 2.0. The resin was cooled to 80° C. and then thinned with Charge #4.

Example 3

Acrylic Polyester Copolymer "A" was made as follows:

TABLE 3

| Ingredients | Parts by Weight |
|---|---|
| Charge #1 | |
| Toluene | 12.9 |
| SOLVESSO 150[1] | 11.0 |
| Charge #2 | |
| Xylene | 6.0 |
| VAZO 67[2] | 2.0 |
| Charge #3 | |
| Butyl Acrylate | 12.0 |
| 2-Hydroxyethyl Methacrylate | 11.2 |
| Methacrylic Acid | 1.0 |
| Styrene | 6.0 |
| 2-Ethylhexyl Acrylate | 4.0 |
| Methyl Methacrylate | 5.8 |
| Polyester A from Example 1 | 135.3 |

TABLE 3-continued

| Ingredients | Parts by Weight |
|---|---|
| Charge #4 | |
| VAZO 67 | 0.1 |
| Xylene | 0.4 |
| Charge #5 | |
| SOLVESSO 150 | 17.9 |

[1]Aromatic hydrocarbon mixture that boils at 150° C. used as a solvent, from Exxon Chemical America.
[2]Azobis 2,2'-(2-methylbutyronitrile), from E. I. duPont de Nemours & Co., Inc.

Charge #1 was added to a 3 liter, 4 necked flask equipped with a motor driven stainless steel stir blade, water-cooled condenser and a heating mantle with a thermometer connected through a temperature feedback control device. The contents of the flask were heated to reflux (128° C.). Addition of Charge #2 (over 190 minutes) began followed by the addition of Charge #3 (over 180 minutes) five minutes later. During the feeds, the reflux temperature gradually rose to 138° C. After the additions were complete, the reaction was held at 138° C. for one hour. Charge #4 was added over 10 minutes and the mixture was held at 138° C. for an additional hour. The resin was thinned with Charge #5.

Example 4

Acrylic Polyester Copolymer "B" was made as follows:

TABLE 4

| Ingredients | Parts by Weight |
|---|---|
| Charge #1 | |
| SOLVESSO 150 | 8.0 |
| Charge #2 | |
| SOLVESSO 150 | 6.3 |
| Di-t-Butyl peroxide | 1.0 |
| Charge #3 | |
| Butyl Acrylate | 12.0 |
| Methacrylic Acid | 1.0 |
| Styrene | 2.0 |
| 2-Ethylhexyl Acrylate | 5.0 |
| Polyester B | 67.3 (46.8 solid) |
| Charge #4 | |
| SOLVESSO 150 | 0.45 |
| Di-t-Butylperoxide | 0.026 |
| Charge #5 | |
| SOLVESSO 150 | 0.45 |
| Di-t-Butylperoxide | 0.026 |
| Charge #6 | |
| SOLVESSO 150 | 0.45 |
| Di-t-Butylperoxide | 0.026 |
| Charge #7 | |
| SOLVESSO 150 | 0.45 |
| Di-t-Butylperoxide | 0.026 |
| Charge #8 | |
| Xylene | 8.7 |

Charge #1 was added to a 2 liter, 4 necked flask equipped with a motor driven stainless steel stir blade, water-cooled condenser and a heating mantle with a thermometer connected through a temperature feedback control device. The contents of the flask were heated to reflux (150° C.). Addition of Charges #2 and #3 were started simultaneously and continued over three hours. After the additions were complete, the reaction was held at 150° C. for 30 minutes. Charges #4, 5, 6 and 7 were then added to the mixture in 30-minute increments. After Charge #7 was added, the mixture was held for 30 additional minutes, was cooled to 130° C. and Charge #8 was added.

Example 5

Acrylic Polyester Copolymer "C" was made as follows:

TABLE 5

| Ingredients | Parts by Weight |
|---|---|
| Charge #1 | |
| SOLVESSO 150 | 10.1 |
| Toluene | 10.1 |
| Charge #2 | |
| Xylene | 3.1 |
| VAZO 67 | 2.0 |
| Charge #3 | |
| Butyl Acrylate | 12.0 |
| Methacrylic Acid | 1.0 |
| Styrene | 6.0 |
| 2-Ethylhexyl Acrylate | 4.0 |
| 2-Hydroxyethyl Acrylate | 11.2 |
| Methyl Methacrylate | 5.8 |
| Polyester B | 14.4 (10.0 solid) |
| Charge #4 | |
| Xylene | 0.31 |
| VAZO 67 | 0.10 |
| Charge #5 | |
| Xylene | 6.7 |

Charge #1 was added to a 2 liter, 4 necked flask equipped with motor driven stainless steel stir blade, water cooled condenser and a heating mantle with a thermometer connected through a temperature feedback control device. The contents of the flask were heated to 128° C. Addition of Charge #2 (over 190 minutes) followed by Charge #3 (over 180 minutes) five minutes later. After the additions were complete, the reaction was held at 150° C. for 30 minutes. During the additions, the temperature was gradually increased reflux at 138° C. After the additions were complete, the reaction was held at 138° C. for 90 minutes. Charge #4 was then added over 10 minutes followed by a one hour hold at 138° C. The resin was then thinned with Charge #5 and then cooled.

Example 6

Three different samples were prepared by charging copolymers A, B, and C, prepared as described in Examples 3, 4 and 5 respectively, into individual containers and mixing in the following ingredients in the order shown under ambient conditions until homogeneous.

TABLE 6

| Ingredient | Sample 1 | Sample 2 | Sample 3 |
|---|---|---|---|
| Copolymer A | 65.9 grams | 0 | 0 |
| Copolymer B | 0 | 65.9 grams | 0 |
| Copolymer C | 0 | 0 | 65.9 grams |
| Phenolic crosslinker[3] | 2.8 | 2.8 | 2.8 |
| Phenolic crosslinker[4] | 8.3 | 8.3 | 8.3 |
| Catalyst[5] | 1.1 | 1.1 | 1.1 |

TABLE 6-continued

| Ingredient | Sample 1 | Sample 2 | Sample 3 |
|---|---|---|---|
| Wax dispersion[6] | 3.3 | 3.3 | 3.3 |
| Solvent[7] | 9.3 | 9.3 | 9.3 |
| Solvent[8] | 9.3 | 9.3 | 9.3 |
| Total | 100 | 100 | 100 |

[3]GPRI 7590 modified phenol-cresol-formaldehyde resin, from Georgia Pacific.
[4]HARZ 6572 LB para-t-butyl phenol-formaldehyde resin, from Bakelite.
[5]ADDITOL XK-406 solution of a cresol-formaldehyde resin and phosphoric acid, from Solutia.
[6]LUBA-PRINT P1 solution of lanolin wax, from L. P. Bader & Co. GmbH.
[7]DOWANOL PM Acetate, propylene acetate glycol monomethylether, from Dow Chemical.
[8]SOLVESSO 150.

Coatings were prepared by drawing Samples 1-3 and a commercially available epoxy liner for food cans (Eurogold XF 12040, from PPG Industries, Inc.) over tin plated steel (E.T.P.) sheets with a #12 wire-wound rod. The coatings were baked for 10.5 minutes at 400° F. The drying coating weights were 4.0 mgs/sq.in.

The coated sheets were evaluated for flexibility by bending and stamping wedges (2.0 inch by 4.5 inches), stamping 300 food can ends, and by drawing cups to 18 mm and 26 mm depths with one and two stages of drawing, respectively. For wedge bends and drawn cups, the percent of coating that remained crack-free along the bend radius (for wedge bends) and along the drawn lengths (for cups) was determined. For the stamped 300 ends, the measured current (in mA) was determined using a WACO enamel rater (obtained from Wilkens-Anderson Company) in 4 sec mode using an electrolyte solution of 7.0 grams of potassium ferrocyanurate, 5.4 grams of sodium chloride, 0.5 grams of sodium sulfosuccinate, and 1000 grams of water. The resistance properties of the coated stamped ends and drawn cups were evaluated by processing (retorting) them in three food stimulants and measuring their ability to resist current (stamped ends) and cracking (drawn cups) after one hour in a sterilizer under 266° F./30 psi conditions. The three stimulants were tap water, a 1% by weight solution of sodium chloride in tap water, and a 1% by weight solution of lactic acid in tap water. All of the results are presented in Table 7.

TABLE 7

| | Commercial Epoxy | Sample 1 | Sample 2 | Sample 3 |
|---|---|---|---|---|
| Flexibility Tests. | | | | |
| 1. Wedge Bend (% crack-free) | 86% | 93% | 92% | 73% |
| 2. Enamel Rater of 300 ends (mA) | 2 mA | 2 mA | 7 mA | 20 mA |
| 3. 18 mm Drawn Cup (% crack-free) | 100% | 100% | 100% | 100% |
| 4. 26 mm Drawn Cup (% crack-free) | 100% | 100% | 100% | 100% |
| Resistance Tests. (60 mins @ 130° C.) 1. Change in Enamel Rater of 300 ends tested in: | | | | |
| a. water | 1 mA | 1 mA | 6 mA | >200 mA |
| b. 1% salt (aq.) | 2 mA | 2 mA | 7 mA | >200 mA |
| c. 1% lactic acid (aq.) | 2 mA | 2 mA | 20 mA | >200 mA |
| 2. 18 mm Drawn Cup (% crack-free) tested in: | | | | |
| a. water | 100% | 100% | 100% | 100% |
| b. 1% salt (aq.) | 100% | 100% | 100% | 100% |

TABLE 7-continued

| | Commercial Epoxy | Sample 1 | Sample 2 | Sample 3 |
|---|---|---|---|---|
| c. 1% lactic acid (aq.) | 100% | 100% | 100% | 100% |
| 3. 26 mm Drawn Cup (% crack-free) tested in: | | | | |
| a. water | 31% | 100% | 100% | 19% |
| b. 1% salt (aq.) | 38% | 58% | 100% | 23% |
| c. 1% lactic acid (aq.) | 46% | 38% | 100% | 19% |

As can be seen from Table 7, Sample 1 had better results than did a current, epoxy-containing food can liner. Sample 2 also had very good results, especially acid resistance. Both Samples 1 and 2 had polyester to acrylic ratios of about 70:30. Sample 3, which had a polyester to acrylic ratio of 20:80 demonstrates that some flexibility can be lost with lower levels of polyester.

Example 7

Polyester Polymer "C" was made as follows:

TABLE 8

| Ingredients | Parts by Weight |
|---|---|
| Charge #1 | |
| 1,3-Butylene Glycol | 177.1 |
| Ethylene Glycol | 34.4 |
| Charge #2 | |
| 1,4-Cyclohexanedicarboxylic Acid | 259.6 |
| Isophthalic Acid | 107.2 |
| Maleic Anhydride | 18 |
| Dibutyltin Oxide | 1.19 |
| Methyl Hydroquinone | 0.054 |
| Charge #3 | |
| Xylene | 27.2 |
| Charge #4 | |
| Xylene | 188.7 |

Charge #1 was added to a round-bottomed, 4-necked flask equipped with a motor driven stainless steel stir blade, a packed column connected to a water cooled condenser and a heating mantle with a thermometer connected through a temperature feed-back control device. The reaction mixture was heated to 125° C. Charge #2 was added to the mixture and the resultant mixture was heated to react in a nitrogen atmosphere. At 130° C., water generated by the esterification process began to be collected. With continuous removal of water, heating continued to 200° C. The reaction temperature was maintained at 200° C. until the distillation of water began to significantly slow. The reaction mixture was cooled to 180° C., the packed column replaced with a Dean-Stark and a nitrogen sparge was started. Charge #3 was added and the reaction was heated to 195° C. for 7 hours at which time the acid value was less than 3.0 mg KOH/gram. The resin was cooled, thinned with Charge #4, discharged and analyzed.

The determined acid value was 2.1 mg KOH/gram, and hydroxy value was 20.9 mg KOH/gram. The determined non-volatile content of the resin was 69.9% as measured by weight loss of a sample heated to 110° C. for 1 hour. Analysis of the polymer by GPC (using linear polystyrene standards) showed the polymer to have an $M_w$ value of 10,115, $M_n$ value of 2,798, and an $M_w/M_n$ value of 3.6.

Example 8

A polyester-graft-acrylic copolymer "C" was prepared as follows:

TABLE 9

| Ingredients | Parts by Weight |
|---|---|
| Charge #1 | |
| SOLVESSO 150 | 44.3 |
| Charge #2 | |
| SOLVESSO 150 | 19.6 |
| LUPEROX 7M50[9] | 5.7 |
| Charge #3 | |
| Butyl Acrylate | 24.3 |
| 2-Hydroxyethyl Methacrylate | 22.6 |
| Methacrylic Acid | 2.0 |
| Styrene | 12.1 |
| 2-Ethylhexyl Acrylate | 8.1 |
| Methyl Methacrylate | 11.7 |
| Polyester C | 270.0 |
| Charge #4 | |
| LUPEROX 7M50 | 1.6 |
| Xylene | 1.6 |
| Charge #5 | |
| LUPEROX 7M50 | 1.6 |
| Xylene | 1.6 |
| Charge #6 | |
| SOLVESSO 150 | 29.9 |

[9]LUPEROX 7M50 is a 50% (weight) solution of tert-butyl peroxyacetate in odorless mineral spirits, from Atofina Chemicals Inc.

Charge #1 was added to a round-bottom, 4-necked flask equipped with a motor driven stainless steel stir blade, water cooled condenser and a heating mantle with a thermometer connected through a temperature feed-back control device. The contents of the flask were heated to reflux temperature. Addition of Charges #2 and #3 were started simultaneously and continued over 3 hours. After the additions were complete, the reaction was held at 145° C. for 60 minutes. Charge #4 was then added to the mixture and after 60 additional minutes charge #5 was added. After Charge #5 was added, the mixture was held for 60 additional minutes, then cooled to 130° C. and Charge #6 was added.

The reaction product was then cooled, discharged and analyzed. The determined acid value was 4.2 mg KOH/gram, and hydroxy value was 35.8 mg KOH/gram. The determined non-volatile content of the resin was 59.3% as measured by weight loss of a sample heated to 110° C. for 1 hour. Analysis of the polymer by GPC (using linear polystyrene standards) showed the polymer to have an $M_w$ value of 113,159, $M_n$ value of 3522, and an $M_w/M_n$ value of 32.1.

Example 9

Polyester "D" was prepared as follows:

TABLE 10

| Ingredients | Parts by Weight |
|---|---|
| Charge #1 | |
| 1,3-Butylene Glycol | 217.3 |
| Ethylene Glycol | 42.3 |
| Charge #2 | |
| 1,4-Cyclohexanedicarboxylic Acid | 327.9 |
| Isophthalic Acid | 135.7 |
| Maleic Anhydride | 22.4 |
| Dibutyltin Oxide | 1.49 |
| Methyl Hydroquinone | 0.067 |
| Charge #3 | |
| Xylene | 33.9 |
| Charge #4 | |
| Xylene | 241.2 |

Charge #1 was added to a round-bottomed, 4-necked flask equipped with a motor driven stainless steel stir blade, a packed column connected to a water cooled condenser and a heating mantle with a thermometer connected through a temperature feed-back control device. The reaction mixture was heated to 125° C. Charge #2 was added to the mixture and the resultant mixture was heated to react in a nitrogen atmosphere. At 130° C., water generated by the esterification process began to be collected. With continuous removal of water, heating continued to 200° C. The reaction temperature was maintained at 200° C. until the distillation of water began to significantly slow. The reaction mixture was cooled to 180° C., the packed column replaced with a Dean-Stark and a nitrogen sparge was started. Charge #3 was added and the reaction was heated to 195° C. for 7 hours at which time the acid value was less than 4.0 mg KOH/gram. The resin was cooled, thinned with Charge #4, discharged and analyzed.

The determined acid value was 3.8 mg KOH/gram, and hydroxy value was 22.9 mg KOH/gram. The determined non-volatile content of the resin was 70.0% as measured by weight loss of a sample heated to 110° C. for 1 hour. Analysis of the polymer by GPC (using linear polystyrene standards) showed the polymer to have an $M_w$ value of 16,672, $M_n$ value of 3,972, and an $M_w/M_n$ value of 3.7.

Example 10

Formulations were prepared using the compositions listed in below in Table 11. The ingredients were added to a paint can, while being agitated with a Cowles blade. The formulated paints were then further mixed to insure homogeneity.

TABLE 11

| | Parts by Weight | |
|---|---|---|
| Ingredient | Sample 4 | Sample 5 |
| Copolymer "C" | 68.8 | 51.6 |
| Polyester "D" | | 15.8 |
| Phenolic resin[10] | 8.3 | 12.5 |
| Catalyst[11] | 3.2 | 3.2 |
| Siloxane[12] | 0.1 | 0.1 |
| Wax dispersion[13] | 4.0 | 4.0 |
| Solvent[14] | 6.6 | 6.6 |

TABLE 11-continued

| Ingredient | Parts by Weight | |
|---|---|---|
| | Sample 4 | Sample 5 |
| Solvent[15] | 1.7 | 1.7 |
| Solvent[16] | 4.5 | 4.5 |
| Xylene | 2.1 | 2.1 |

[10]BAKELITE 6608 phenolic resin solution, from Bakelite AG.
[11]ADDITOL XK-406.
[12]BYK 310 modified polydimethylsiloxane, from Byk Chemie.
[13]LUBA-PRINT P1.
[14]DOWANOL PM acetate.
[15]SOLVESSO 150.
[16]SOLVESSO 100 is mixture of hydrocarbons, from Exxon Chemical America.

Coatings were applied to tin-plated steel coupons using a wire-bound bar. The coatings were applied at a dry film weight of 6 grams per m2. After application the coated coupons were baked at a 200° C. peak metal temperature for 10 minutes. The cured coated coupons were then stamped into 300 size food can ends or drawn into various depth cups. The results of the testing of the can ends and cups are shown below in Table 12.

TABLE 12

| Coating Properties | Commercial Epoxy | Sample 4 | Sample 5 |
|---|---|---|---|
| MEK Double Rubs[17] | 100 | 16 | 50 |
| Wedge Bend Flex (% crack-free) | 80% | 85% | 88% |
| Resistance Tests (60 mins @ 130° C.) | | | |
| General Rater of 300 can tested in: | | | |
| Initial | 6.2 mA | 2.1 mA | 2.4 mA |
| After 130° C./1 hr in 1% salt aqueous soln. | +0.7 mA | +0.5 mA | +0.9 mA |
| After 130° C./1 hr in 1% citric acid aqueous soln. | +0.9 mA | +1.2 mA | +1.5 mA |
| After 130° C./1 hr in 1% lactic acid aqueous soln. | +1.4 mA | +0.4 mA | +0.7 mA |
| 18 mm drawn cups (% crack-free) tested in: | | | |
| Initial | 100% | 100% | 100% |
| After 130° C./1 hr in 1% salt aqueous soln. | 100% | 100% | 100% |
| After 130° C./1 hr in 1% citric acid aqueous soln. | 100% | 100% | 100% |
| After 130° C./1 hr in 1% lactic acid aqueous soln. | 100% | 100% | 100% |
| 26 mm drawn cups (% crack-free) tested in: | | | |
| Initial | 46% | 100% | 100% |
| After 130° C./1 hr in 1% salt aqueous soln. | 46% | 46% | 46% |
| After 130° C./1 hr in 1% citric acid aqueous soln. | 38% | 35% | 38% |
| After 130° C./1 hr in 1% lactic acid aqueous soln. | 35% | 38% | 38% |

[17]A rag saturated with MEK solvent was rubbed back and forth over the face of the coating using an index finger. The rag was re-saturated every 25 rubs, with one back and forth cycle equaling one rub. The number in Table 12 reflects the rub number at which a break in the coating to the metal substrate was observed.

As demonstrated in Table 12, the compositions of the present invention have comparable performance to a commercially available epoxy-containing coating.

Whereas particular embodiments of this invention have been described above for purposes of illustration, it will be evident to those skilled in the art that numerous variations of the details of the present invention may be made without departing from the invention as defined in the appended claims.

Therefore we claim:

1. A method for coating a food can comprising applying to the interior of the food can a composition comprising:
   (a) a polyester/acrylic graft copolymer;
   (b) a polyester resin; and
   (c) a crosslinker,
wherein the composition is epoxy free.

2. The method of claim 1, wherein the polyester/acrylic graft copolymer has the acrylic grafted to the polyester.

3. The method of claim 1, wherein the polyester/acrylic graft copolymer has the polyester grafted to the acrylic.

4. The method of claim 1, wherein the polyester in the polyester/acrylic graft copolymer is unsaturated.

5. The method of claim 4, wherein the polyester in the polyester/acrylic graft copolymer comprises maleic acid or anhydride and the acrylic copolymer comprises styrene.

6. The method of claim 1, wherein the polyester in the polyester/acrylic graft copolymer has a hydroxy value of 0 to 200 and an acid value of less than 10.

7. The method of claim 6, wherein the polyester in the polyester/acrylic graft copolymer has a hydroxy value of 30 to 70 and an acid value of less than 5.

8. The method of claim 1, wherein the graft copolymer has a weight average molecular weight of 3000 to 250,000.

9. The method of claim 1, wherein the graft copolymer has a weight average molecular weight of 60,000 to 120,000.

10. The method of claim 1, wherein the polyester in the polyester/acrylic graft copolymer comprises the reaction product of butanediol, ethylene glycol, cyclohexane dicarboxylic acid, isophthalic acid and/or maleic acid and/or anhydride.

11. The method of claim 1, wherein the acrylic in the polyester/acrylic graft copolymer comprises styrene, butyl acrylate, hydroxyethyl(meth)acrylate, ethylhexylacrylate and/or methacrylic acid.

12. The method of claim 10, wherein the acrylic in the polyester/acrylic graft copolymer comprises styrene, butyl acrylate, hydroxyethyl(meth)acrylate, ethylhexylacrylate and/or methacrylic acid.

13. The method of claim 1, wherein the weight ratio of polyester:acrylic in the graft copolymer is 95:5 to 20:80.

14. The method of claim 13, wherein the weight ratio of polyester:acrylic in the graft copolymer is 70:30.

15. The method of claim 1, wherein the crosslinker is or is derived from melamine.

16. The method of claim 1, wherein the crosslinker is or is derived from a resole, novalac and/or derivatives thereof that does not contain bisphenol A.

17. The method of claim 1, wherein the polyester resin comprises the reaction product of butanediol, ethylene glycol, cyclohexane dicarboxylic acid, isophthalic acid and/or maleic acid and/or anhydride.

18. The method of claim 1, wherein the polyester resin is saturated.

19. The method of claim 1, wherein the polyester resin is unsaturated.

20. The method of claim 1, wherein the polyester resin and the polyester in the graft copolymer have the same composition.

21. The method of claim 20, wherein the polyester resin has a higher weight average molecular weight than the polyester in the graft copolymer.

22. The method of claim 1, wherein the weight ratio of polyester resin to graft copolymer is 5:95 to 35:65.

23. The method of claim 22, wherein the weight ratio of polyester resin to graft copolymer is 25:75.

24. The method of claim 1, wherein the polyester in the graft copolymer and the polyester resin comprise maleic anhydride.

\* \* \* \* \*